US012618574B2

(12) United States Patent
Dos Santos Almeida Nunes et al.

(10) Patent No.: US 12,618,574 B2
(45) Date of Patent: May 5, 2026

(54) AIR QUALITY ENHANCEMENT SYSTEM BASED ON FLUID MECHANICS AND INTEGRATED UV EMISSION

(71) Applicants: ASSOCIACAO BLC3—CAMPUS DE TECNOLOGIA E INOVACAO, Lagares (PT); UNIVERSIDADE DE COIMBRA, Coimbra (PT); UNIVERSIDADE DO MINHO, Braga (PT); FACULDADE DE FARMACIA DA UNIVERSIDADE DE LISBOA, Lisbon (PT)

(72) Inventors: Joao Miguel Dos Santos Almeida Nunes, Oliveira Do Hospital (PT); Gabriela Conceicao Duarte Jorge Da Silva, Coimbra (PT); Sandra Maria Braga Franco, Braga (PT); Joao Manuel Maciel Linhares, Braga (PT); Jose Miguel Azevedo Pereira, Lisbon (PT); Quirina Alexandra Pinto Dos Santos Costa, Lisbon (PT); Elsa Maria Ribeiro Dos Santos Anes, Lisbon (PT); David Alexandre Rodrigues Pires, Linda a Velha (PT)

(73) Assignees: ASSOCIACAO BLC3—CAMPUS DE TECNOLOGIA E INOVACAO, Lagares Ohp (PT); UNIVERSIDADE DE COIMBRA, Coimbra (PT); UNIVERSIDADE DO MINHO, Braga (PT); FACULDADE DE FARMACIA D UNIVERSIDADE DE LISBOA, Lisbon (PT)

( * ) Notice: Subject to any disclaimer, the term of this patent is extended or adjusted under 35 U.S.C. 154(b) by 412 days.

(21) Appl. No.: 18/041,444

(22) PCT Filed: Aug. 12, 2021

(86) PCT No.: PCT/IB2021/057430
§ 371 (c)(1),
(2) Date: Feb. 13, 2023

(87) PCT Pub. No.: WO2022/034530
PCT Pub. Date: Feb. 17, 2022

(65) Prior Publication Data
US 2023/0400205 A1 Dec. 14, 2023

(30) Foreign Application Priority Data
Aug. 12, 2020 (PT) ........................................ 116640

(51) Int. Cl.
*F24F 8/22* (2021.01)
*B01D 46/00* (2022.01)
(Continued)

(52) U.S. Cl.
CPC ............ *F24F 8/22* (2021.01); *B01D 46/0027* (2013.01); *B01D 46/0028* (2013.01);
(Continued)

(58) Field of Classification Search
CPC ........................ B01D 46/0027; B01D 46/0028
See application file for complete search history.

(56) References Cited

U.S. PATENT DOCUMENTS 3,511,162 A 5/1970 Truhan
5,225,167 A 7/1993 Wetzel
(Continued)

FOREIGN PATENT DOCUMENTS

CA 3082990 A1 * 6/2018
CN 109237673 A 1/2019
(Continued)

OTHER PUBLICATIONS

International Search Report and Written Opinion for Corresponding International Application No. PCT/IB2021/057430 (12 Pages) ( Nov. 19, 2021).

*Primary Examiner* — Robert A Hopkins
(74) *Attorney, Agent, or Firm* — LUCAS & MERCANTI, LLP

(57) ABSTRACT
A system for improving indoor air quality for shared and confined spaces with people. This allows an improvement in
(Continued)

surrounding air quality in indoor spaces and interaction situations with (i) groups of people among themselves (inter-person transmission), (ii) between people and the above-mentioned indoor spaces (confined spaces, buildings and/or airborne and/or overland and/or seaborne passenger transportation systems and/or confined patient transportation systems such as pods/incubators and others similar thereto), and also (iii) for interaction between people and invasive and non-invasive mechanical ventilation systems. The system proposes the use of a system based on fluid mechanics and UV wavelengths for inactivating viruses and bacteria.

5 Claims, 8 Drawing Sheets

(51) Int. Cl.

| | |
|---|---|
| *F24F 3/167* | (2021.01) |
| *F24F 7/10* | (2006.01) |
| *F24F 8/24* | (2021.01) |
| *F24F 11/72* | (2018.01) |
| *F24F 13/02* | (2006.01) |

(52) U.S. Cl.
CPC ................ *F24F 3/167* (2021.01); *F24F 7/10* (2013.01); *F24F 8/24* (2021.01); *F24F 11/72* (2018.01); *F24F 13/0236* (2013.01); *F24F 2221/34* (2013.01)

(56) References Cited

U.S. PATENT DOCUMENTS

| | | | | |
|---|---|---|---|---|
| 9,050,382 B2 * | 6/2015 | Carr | ........................... | A61L 9/02 |
| 9,452,235 B2 * | 9/2016 | Veen | .......................... | A61L 9/20 |

FOREIGN PATENT DOCUMENTS

| | | | | | |
|---|---|---|---|---|---|
| FR | 3027229 | A1 | 4/2016 | | |
| GB | 1069632 | A | 5/1967 | | |
| KR | 20130004735 | U | * | 8/2013 | ........... A01K 1/0064 |
| WO | 03045534 | A1 | 6/2003 | | |
| WO | 2011006509 | A1 | 1/2011 | | |

* cited by examiner

30

1

AIR QUALITY ENHANCEMENT SYSTEM BASED ON FLUID MECHANICS AND INTEGRATED UV EMISSION

CROSS-REFERENCE TO RELATED APPLICATIONS

This application is a 371 of PCT/IB2021/057430, filed Aug. 12, 2021, which claimed the priority of Portuguese Application No. 116640, filed Aug. 12, 2020, both of which are incorporated herein by reference.

Technical Domain

The present invention describes a system for improving indoor air quality for shared and confined spaces with people.

BACKGROUND

Viruses, bacteria, and other microorganisms have weak points that can be exploited at the inactivation level and for the protection of people, such as for example:
  i) inactivation through exposure to pH<2;
  ii) exposure to temperatures above 65° C. for periods longer than thirty minutes (according to an Influenza A study); or
  iii) exposure to UV radiation.

However, there are weak points and other aspects to be taken into account for its applicability within the context of public health and protecting the safety of people. Consequently, and with regard to inactivation through exposure to pH<2, this offers limitations resulting from high permanent disinfection costs for large areas and the release of volatile compounds that are harmful to health, limiting its application due to the high risks resulting from the continued exposure of healthcare practitioners, for example. Using temperatures above 65° C. for periods of more than thirty minutes has also not proven very feasible, due either to the cost of high temperature levels, and the same issue of technological implementation over large areas. Finally, UV radiation, which is a functionally low-cost technology compared to the previous options, is functional and may be used to inactivate viruses and bacteria in a controlled manner and within a well-defined context. The use of this technology is scientifically grounded and proven (nature-based solution: for thousands of years, no viruses or bacteria are known to have withstood UV radiation).

The UV-C inventions and technologies developed so far are for use in the context of pandemics, for example, at places with high concentrations of people, in zones and/or confined spaces, with a significant part of confinement in buildings, such as airports, subway zones, and parking areas, as well as overland passenger transportation systems (for example, automobiles, trains, subways and others).

The morphology of the SARS-COV-2 virus is similar to that of the SARS-COV-1 virus for the RNA genome, acting mainly at the lung infection level, which increases its capacity to infect through the air, which may be translated into the possibility of infection in the "airborne" form, contaminating people by the transmission pathway through (1) contact (deposited on materials and surfaces); (2) forced and natural convection (inhalation through the mouth and nose and through air coming into contact with the eyes); and (3) "radioactive" (directly through droplets and actions of the hand in contact with the eyes, mouth and nose).

Droplet projections may reach two meters, and in aerosol form (conveyed by fluid in the vapor exhaled by human beings) may reach eight meters. Furthermore, in places such as healthcare facilities when the virus is present in vapor fluid, it may be conveyed over longer distances, due to the length of time that it remains in the air, for three to four hours.

Slanting the problem only towards the context of the invention, wide-spaced social distancing between a healthcare practitioner and a patient is not feasible. The problem is how to achieve social distancing far closer than the minimum safety level without giving rise to problems with contamination, while at the same time allowing the healthcare practitioner to undertake their work safely. On the other hand, avoiding the dispersal of particles through the air and on materials and places, due to the spreading capacity of the transportation fluid (vapor and droplets).

Still at the public health safety and quality level for people in the presence of airborne microorganisms, another problem is associated with the fact that the higher the concentration levels in presence of "airborne virus" (also called aerosols and under the "airborne" effect), and microorganisms in confined indoor areas such as, for example, buildings and transportation systems, the higher the risk of people interacting with these spaces being contaminated by viruses, bacteria and other microorganisms, as well as interactions among people rendering care services and coming into contact with other people, such as for example physicians and users, nurses and healthcare technicians in the screening zone for identifying and referring users in healthcare facilities, as well as other examples, like airport workers and professional home services providers.

At the level of interaction among (A) people and indoor spaces and/or confined areas in buildings and/or transportation systems, and for interaction among (B) groups of people, major challenges arise for which solutions are sought, namely:
  1. How can healthcare practitioners be protected, without increasing the number of infected and hospitalized patients?
  2. Healthcare facilities are "incubators" for viruses, bacteria, and other microorganisms, and vehicles for contamination, spreading them. How can these problems be reduced, by fostering better indoor air quality?
  3. Interaction with people who are asymptomatic and at an early stage of infection lessens the care and attention of healthcare practitioners and others in their relationships with users, with the same happening for other types of services with heavy flows of people. How can the level of safety, care and protection be increased during interactions between people and/or among groups of people?
  4. How can a discipline/physical barrier be set up between the healthcare practitioner and the user or between a home services provider and the respective user, or between a home visitor and the respective user?
  5. How can people be protected in indoor spaces set aside as eating and drinking areas, when the act of eating and drinking requires removing the mask (and/or other personal protection equipment)? situation is particularly important, particularly because of the existence of cases of infection that are asymptomatic or symptomatic but not visible, or carriers of microorganisms that can be transmitted through the physical state by gas, being able to project these microorganisms into the surrounding space. These situations will be worsened by the presence and use of forced air convection systems in these spaces for renewing indoor air and/or climatization. How can air quality be enhanced, while lessening the potential concentration lowered of microorganism particles in these spaces, and the potential contamination of people? Where the action of masks does not offer protection for the eyes against infection by viruses, bacteria and other microorganisms in the air, and may even cause a forced airstream effect towards the facial area around the eye, giving rise to the forced entry of viruses and other microorganisms through h this pathway, particularly for professionals who to are exposed significant periods of time in confined spaces.

6. How can people be protected in indoor spaces with heavy user flows, where the ratio between large numbers of users and the available useful area gives rise to a higher concentration of suspended particles of viruses and other microorganisms? HOW can the minimization of airborne infection through the eyes, nose and mouth be assured, when users spending long periods in these spaces remove their masks only because nobody else is near them, paying attention to the fact of airborne contamination.

7. How can the safety of a person be assured (either directly or indirectly during interpersonal interaction) in view of the potential lack of operating efficiency of a specific mask or personal protection equipment, which might have microcracks that let nanoparticles of viruses and other microorganisms pass through, and might also be damaged through washing or manufacturing problems and defects?

8. How can protection be provided when transporting people infected by viruses and other microorganisms, or with circumstantial evidence indicating that they are infected, when changing care and moving between healthcare facilities, and/places of treatment, when presenting hazardous infection levels?

9. The lifetime of an airborne virus (one of the main problems behind the high infection level of healthcare practitioners) is forecast at three to four hours: sufficient to move over long distances and across wide spaces and in the four spatial dimensions, in other words in the x, y, z dimensions (length, width and depth) as well as time (from the time position equal to n seconds) to the time position equal to n+1 seconds), whereby traditional UV-emitting technologies (such as UV-C, germicidal) are not efficacious and efficient, because they do not ensure a minimum contact time with the particle virus, bacteria and/or other microorganisms, as the UV action on the microorganisms is not instantaneous, needing time to act. How is it possible to inactivate microorganism particles that move through the four dimensions, or bring them to a physical state where they do not constitute a public safety and health problem?

10. How can people be protected on smaller transportation systems, such as vehicles transporting passengers at work, which normally present high occupancy rates for lengthy periods of time, as well as transporting sick people in ambulances? Particularly during the winter, when it is not feasible to open windows, and that may lead to forced flows of air and/or gases that step up potential inter-person transmission and thus force the installation of contaminated air?

11. How can a protection system be achieved in the interaction of people with building interiors where it is not possible to install an air flow system?

12. In addition to environmental issues and problems related to indoor air quality and human intoxication, the use of chemical products gives rise to genetic adaptation processes and multiresistance among microorganisms. What is the alternative to using chemicals for disinfection?

13. How can people be transported safely, for example on stretchers or other transportation systems, for hospitalization or clinical intervention, with possible release levels for viruses and other microorganisms that should be inactivated? At the moment, the pods and incubators in use merely provide isolation and transportation between shared spaces to place of intervention or the hospitalization, but t ignore the moment when the pod is opened, when all the air and/or gases present will be released. In other words, at the moment there is no way of protecting the many interveners (medical staff and patients) during the entire transportation process, particularly during the extraction phase of the person, which results in the abrupt release of high levels of airborne virus particles and other microorganisms.

The intention behind the air quality enhancement system described below is to resolve and surmount all these issues and other questions and problems found at the current state of the art.

SUMMARY

This application describes an air quality enhancement system, for use in indoor and/or confined spaces shared by people, characterized in that it comprises at least one lower injection chamber; and at least one upper extraction chamber; wherein the at least one upper extraction chamber comprises at least one UV radiation emission source; and the at least one lower injection chamber comprises at least one UV radiation emission source.

In one proposed embodiment of the invention, the air quality enhancement system for use in indoor spaces is characterized in that it comprises conduits for the supply of a flow of air and/or gases.

In another proposed embodiment, the air quality enhancement system for use in indoor spaces is characterized in that it comprises conduits for the intake of a flow of air and/or gases.

In yet another embodiment, the at least one lower injection chamber of the air quality enhancement system for use in indoor spaces comprises at least one controlled force action system air and/or gas inflows.

In yet another embodiment, the at least one upper extraction chamber of the air quality enhancement system for use in indoor spaces comprises at least one controlled force action system for air and/or gas outflows.

In yet another form of embodiment, the at least one lower injection chamber and/or the at least one upper extraction chamber of the air and/or gases quality enhancement system for use in indoor spaces comprises an integrated information collection, command, and control system.

In yet another embodiment, the at least one controlled force-controlled force air inflow action system and/or the at least one controlled force air outflow action system of the air and/or gases quality enhancement system for use in indoor spaces comprise at least one flow regulator valve, cut-off valves, mechanical and electrical actuation systems for blowers/fans and/or rotors and/or turbines.

In yet another embodiment, the at least one controlled force-controlled force air inflow action system and/or the at least one controlled force air outflow action system of the air and/or gases quality enhancement system for use in indoor spaces comprise a heat source for increasing the contact temperature of the air and/or gas the inflows and outflows. This heat source may present a range of values between 70° C. and 500° C.

In yet another embodiment, the at least one lower injection chamber and/or the at least one upper extraction chamber of the air quality enhancement system for use in indoor spaces comprise a spraying system for antimicrobial chemical compounds with antiviral and/or antibacterial and/or antifungal properties, comprised of a line of sprayers with microspray nozzles projecting over the flow of air and/or gases.

This application also describes an air quality enhancement system, for deployment at a close interpersonal interaction point, characterized in that it comprises at least one isolation chamber; and at least one extraction chamber; wherein the at least one extraction chamber comprises the at least one conduit for the intake of an individualized airflow, installed on the upper surface of the at least one isolation chamber, and at least one UV rays emission source.

In one proposed embodiment, the isolation chamber of the air quality enhancement system for deployment at a close interpersonal point comprises interaction a physical structure comprised of a transparent separator installed vertically so as to divide the space between the two users, and a protective divider installed vertically at the top of the chamber support, creating a protective barrier between the user and the isolation chamber.

In yet another proposed embodiment, the air quality enhancement system for deployment at a close interpersonal interaction point comprises a sliding moveable lateral protection device, connected to the physical structure and installed vertically at an angle of 90 degrees to the transparent separator.

In yet another proposed embodiment, the extraction chamber of the air quality enhancement system for deployment at a close interpersonal interaction point comprise at least an integrated information collection, command, and control system.

In yet another proposed embodiment, the at least one conduit for the intake of the flow of air and/or gases from the air quality enhancement system for deployment close interpersonal interaction point comprise at least one controlled force action system for the intake of the flow of air and/or gases, comprising at least. one flow regulator valve, cut-off valves, mechanical and electrical actuation systems for blowers/fans and/or rotors and/or turbines, a heat source for increasing the contact temperature of the air and/or gas inflows and outflows from 70° C. to 500° C., and a spraying system for antimicrobial chemical compounds with antiviral and/or antibacterial and/or antifungal properties, comprised of a line of sprayers with microspray nozzles projecting over the flow of air and/or gases.

This application also describes an air quality enhancement system, for use in pod type and/or incubator style confined spaces and/or some other type of confined equipment for transporting people and/or patients, characterized in that it comprises at least one isolation chamber comprising at least one swing flap panel for accessing the inside of the chamber; at least one lower injection chamber; and at least one upper extraction chamber; wherein the at least one upper extraction chamber comprises at least one UV radiation emission source; the at least one lower injection chamber comprises at least one UV radiation emission source; and the isolation chamber comprises at least one air and/or gases inflow device interconnected to the at least one lower injection chamber, at least one air and/or gases outflow device interconnected to the at least one upper extraction chamber and a UV emission system.

This application also describes the method of functioning for an air quality enhancement system for use in indoor and/or confined spaces shared by people, which comprises the steps of:

i. Injection of flow of air and/or gases, with entry into a chamber through a controlled force action system;
  ii. Control of the inflow of air and/or gases in accordance with the outflow and in a manner that creates an air curtain for the protection of people, as close as possible in an upwards direction;
  iii. Passage through the microbial inactivation system, applicable to viruses, bacteria and other microorganisms, through UV action, with a length of 207 nm to 260 nm, that has more than one "back up" actuation system, comprising a heating system with a heat exchanger for creating a contact temperature with the flow of air and/or gases of 70° C. to 500° C. and/or a microspraying system for chemical agents, for situations when it is necessary to inactivate larger streams of air and/or gases in smaller spaces where UV emission contact times/intensity cannot be achieved with particles in the flow of air and/or gases;
  iv. Controlled system with the creation of a distribution model for creating an air curtain and/or gas flows, rising upwards as much as possible, in order to create a protective flow for people conveys possible microorganisms present in the indoor air of buildings and confined spaces to a higher zone that will act on the inactivation of such microorganisms, ensuring that, in addition to lowering their concentration and presence in the indoor air, their release outside the building will not give rise to air quality problems in the areas around the building or that they might, in some situations, re-enter the building at a higher level: and
  v. The air and/or gases outflow zone presented the same composition, system and air and/or gases inflow zone control unit.

This application also describes the method of functioning for an air quality enhancement system for deployment at a close interpersonal interaction point, which comprises the steps of:

i. Placement of the Person/User A and the Person/User B at the chamber entrance positions, which allows audiovisual interaction;
  ii. The chamber also allows for a physical barrier and a method for controlling contact between people/users;
  iii. The air exhaled by people/users is conveyed into the inside of the chamber, within the context of the specific placement of people/users, the geometry of the chamber and the direction and flow of air and/or gases generated by the respiratory system, as well as projections of droplets generated by people;
  iv. The chamber allows droplet projections and the flow of air and/or gases generated during breath to be trapped in the chamber, whose geometry may vary, in order to have the correct volume;
  v. The chamber presents lateral protection in the form of "flaps" that prevent the generation of lateral crossflows or turbulent flows that give rise to early outflows of air and/or gases without first being inactivated;
  vi. The air that is in the chamber may be extracted by a controlled force system that conveys it and ensures there are no air and/or gas outflows towards the people, but rather through the upper outlet where they are then inactivated;

vii. The chamber may also function, depending on the frequency of the interaction and duration of the interaction between people/users, without the first extraction system, through the system that already has interior UV emission integrated therewith, with protection through materials and geometry that ensure the UV rays are not projected outside of the chamber, in order to protect the safety and health of people/users;

viii. In a more practical situation, the central barrier separating the two interaction zones may be removed in order to allow direct interaction through a visual interior tunnel format;

ix. As the final step, the chamber also allows close physical contact between a person and person/user, through an internal moveable lateral system that allows physical protection to be moved through a chute to the area alongside the person, who can then engage in contact actions with protection, using a fixed glove that serves as a physical barrier, and restoring the capacity of the chamber by returning the glove to the inside of the chamber so that it can be disinfected, inactivating possible virus particles and other microorganisms.

This application also describes the method of functioning for an air quality enhancement system for use in pod type and/or incubator style confined spaces and/or some other type of confined equipment for transporting people and/or patients, which comprises the steps of:

i. Opening the entrance zone, connected to the air and/or gases inflow and outflow system;

ii. Person placed in the pod (confined space, or incubator, or another similar confined space);

iii. Possibility of physical interaction during transportation, through the gloves system installed and connected to the pod;

iv. Opening the side zone window for removing the person/user;

v. Closing the side zone window, after which the UV emission system is then connected to the interior of the pod, in order to disinfect the materials in contact with the transported person/user; and vi. Possibility of connecting and placing a gamma ray emission system in the chamber for situations involving the transportation of people within a context of exposure to radioactivity.

BRIEF DESCRIPTION

This invention addresses a system for improving indoor air quality in shared spaces.

The system that has been developed is slanted towards providing protection for contact and interaction (A) between people (interpersonal), (B) between people and indoor air in buildings and (C) between people and transportation systems, and other services that might give rise to situations involving contact at less than two meters between two or more people.

It was developed on the basis of fluid mechanics, underpinning the generation of natural and forced air curtains for the protection of people, allowing possible contacts with airborne viruses and bacteria to be steered into an inactivation and disinfection zone, with the combined and modular integration of precise and directed UV radiation emissions.

The system that has been developed is intended to ensure the creation of antechamber zones for interaction among people, such as the interaction between people and zones inside buildings, through the same combined base of interaction between the fluid mechanics of the system and the part emitting UV at wavelengths of 200 nm to 260 nm, avoiding turbulent regimes and dead zones with a higher concentration of virus and bacteria particles.

Through the use of current air renewal and climatization systems, the system also allows the avoidance of horizontal projection and air fluid outflows tending towards horizontal, with a higher probability of virus infection among people, and between people and buildings and transportation systems, due to the significant increase in the passage and flow of particles and mass transmission among people and between the air and people, as the horizontal direction fosters the intake of air through the mouth, nose and eyes, which are weak points where viruses and bacteria enter people's bodies.

This is a system and technology for immediate application, responding to immediate needs and providing medium and long-term protection for healthcare practitioners, patients and other users of healthcare facilities, with significant impact on improving public health quality.

The concept is also based on the use of a transparent protection and interaction chamber using UV radiation, without adversely affecting the safety of healthcare practitioners, patients or other users, which disinfects projections and helps reduce airborne virus concentration levels and contact zones.

The concept also allows the appearance of the discipline effect, reducing laxity resulting from either a lack of knowledge or exhaustion caused by long hours of work and stress, in the relationship between the healthcare practitioner and the patient.

In addition to protecting direct contact, this chamber then reduces the presence of airborne viruses and other microorganisms at places with higher concentration and contamination levels that serve incubation sites for transmission vectors that spread through society. Consequently, this also lessens the probability of users of the space (professionals and users) being contaminated, and the spaces being vectors for contamination and extending the spread of the SARS-COV-2 virus and other pathogens, contributing strongly to public health.

BRIEF DESCRIPTION OF THE FIGURES

For an easier understanding of this application, the Figures are appended hereto, presenting embodiments that nevertheless make no attempt to limit the technique disclosed herein.

0—Design for determining minimum dispersal solutions for inflows and outflows of air+other gases;

1A—Mechanisms of action by controlled forces;

1B—Mechanisms of action by uncontrolled forces (airflow exhaled by a person);

2—Inflow and use of air (and other gases present in the interaction zone=X m3;

3A—Development and formation of air and gas curtains protecting people;

3B—Development and formation of air and gas flow control from the human respiration process;

4—Outflow of air (and other gases present)=X m3;

CDF—Airflow dispersal control;

Cfi—Control of inflow of air and/or gas (pressure meter, flow control valve and shut-off valve);

CG—General control and command unit;

CFf—Control of outflow of air and/or gas (airflow speed and pressure meter, flow control valve and shut-off valve).

Figure 2:
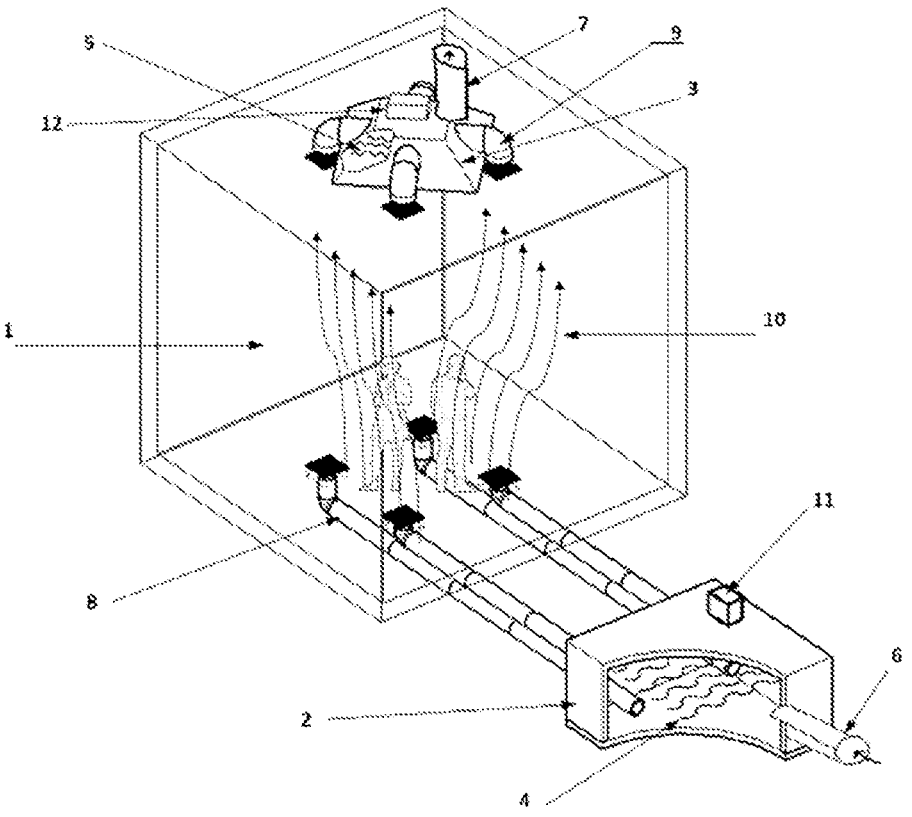

FIG. 2 illustrates a possible form of implementation for the air quality enhancement system (1) for use in indoor spaces ensuring the safe use thereof. The Reference numbers represent:

1. Proposed system (interaction zone between people and the interior of the confined space or interior of a building);

2. Lower injection chamber;

3. Upper extraction chamber;

4. UV radiation emission source of the lower injection chamber;

5. UV radiation emission source of the upper extraction chamber;

6. Controlled force action system of the lower chamber for inflow of air and/or gases;

7. Controlled force action system of the upper chamber for outflow of air and/or gases;

8. Air and/or gas inflow conduits;

9. Air and/or gas outflow conduits;

10. Air and/or gas curtain;

11. Integrated information collection, command, and control system of the lower chamber;

12. Integrated information collection, command, and control system of the upper chamber.

Figure 3:
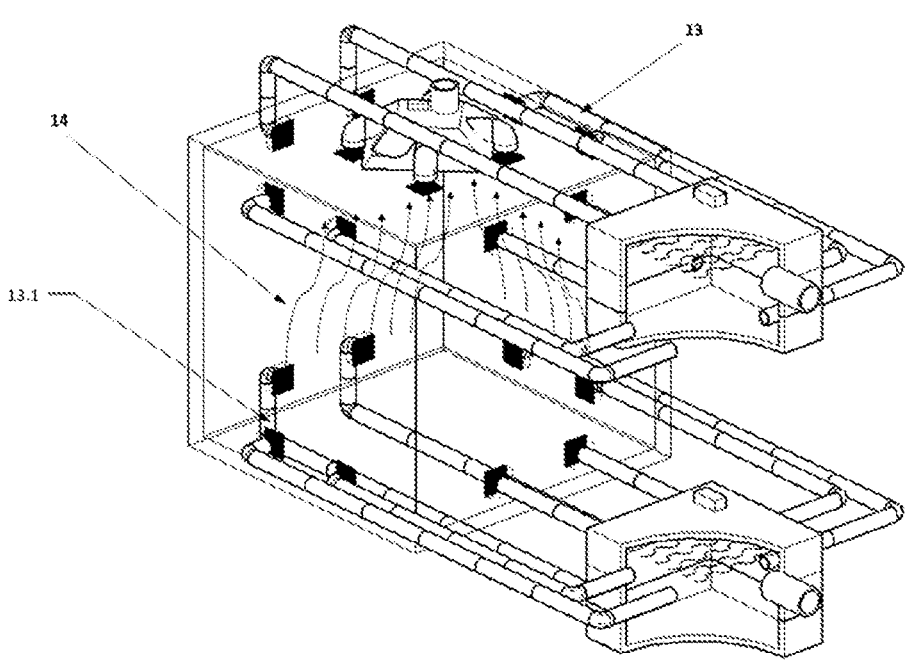

FIG. 3 illustrates a possible form of implementation of the system (1) proposed for interaction between people and indoor spaces. The system may be applicable to airborne and/or overland and/or waterborne transportation systems and/or the interiors of buildings fitted with air and/or gases inflow points. The Reference numbers represent:

13. upper air and/or gases outflow point;

13.1 lower side inflow point;

14. air upflows.

Figure 4:
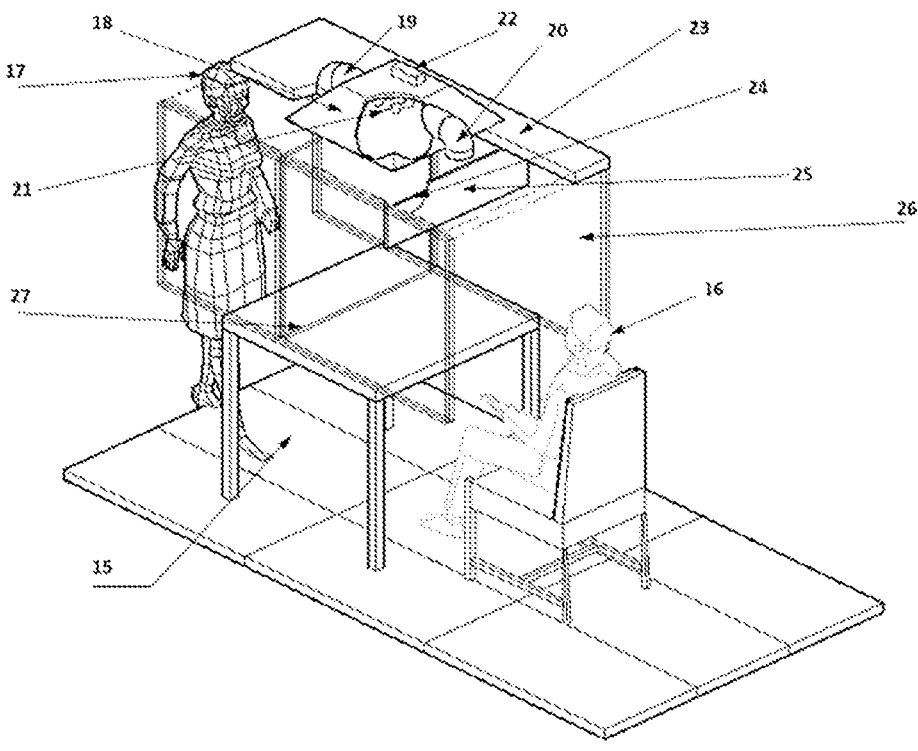

FIG. 4 illustrates a possible form of implementation of the system (1) proposed for close interpersonal interaction. The Reference numbers represent:

15. Application zone/isolation chamber;

16. Person/User A;

17. Person/User B;

18. Extraction chamber;

19. Air outflow and intake conduit (person B);

20. Air outflow and intake conduit (person A);

21. UV radiation emission source of the extraction chamber;

22. Integrated information collection, command, and control system;

23. Upper surface;

24. Ancillary UV emission system;

25. Protective flap/divider;

26. Physical structure of the chamber;

27. Transparent separator.

Figure 5:
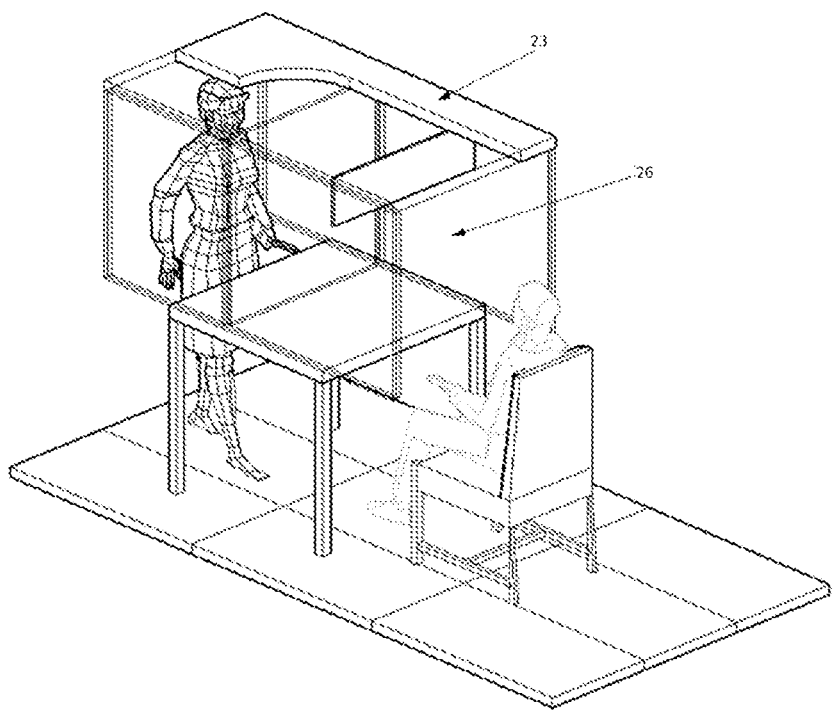

FIG. 5 illustrates a possible form of implementation of the system (1) proposed for close interpersonal interaction. The Reference numbers represent:

23. Upper surface;

26. Physical structure of the chamber.

Figure 6:
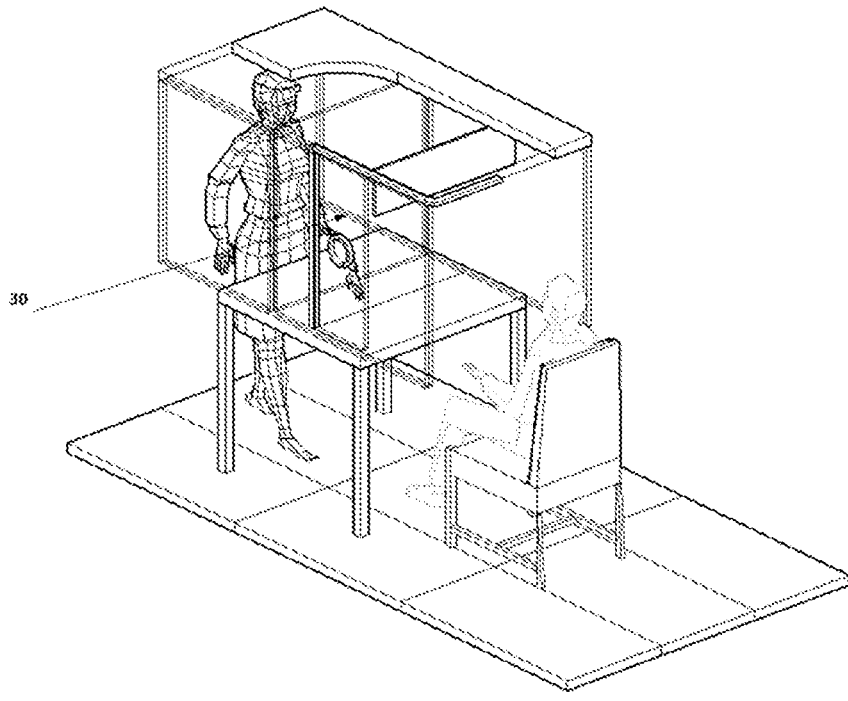

FIG. 6 illustrates a possible form of implementation of the system proposed for close interpersonal interaction in the isolation chamber (15). The reference numbers represent:

30. Moveable lateral protection, shown in position i).

Figure 7:
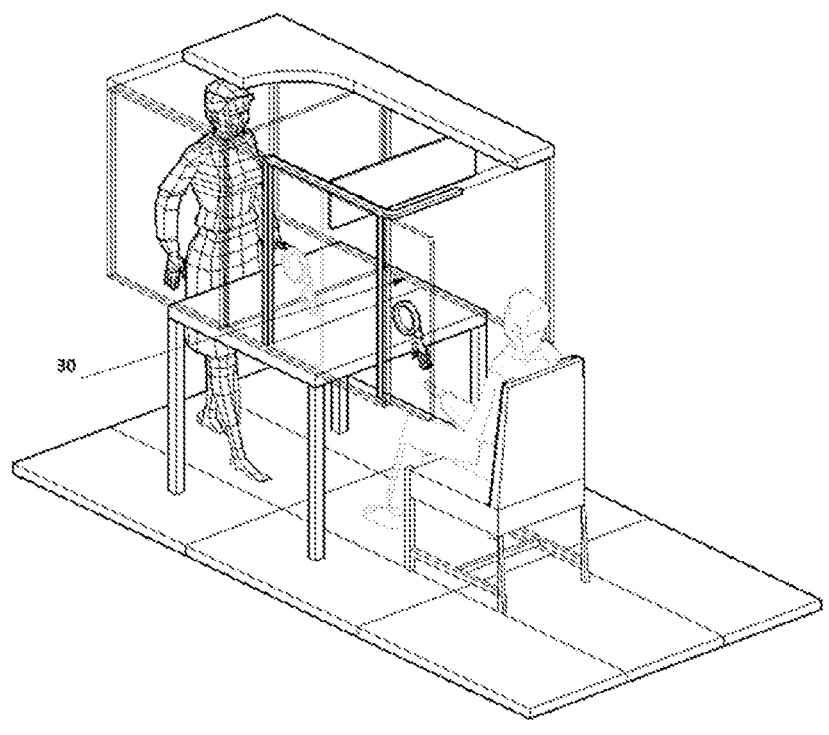

FIG. 7 illustrates a possible form of implementation of the system (1) proposed for close interpersonal interaction in the isolation chamber (15). The reference numbers represent:

30. Moveable lateral protection, shown in position ii).

Figure 8:
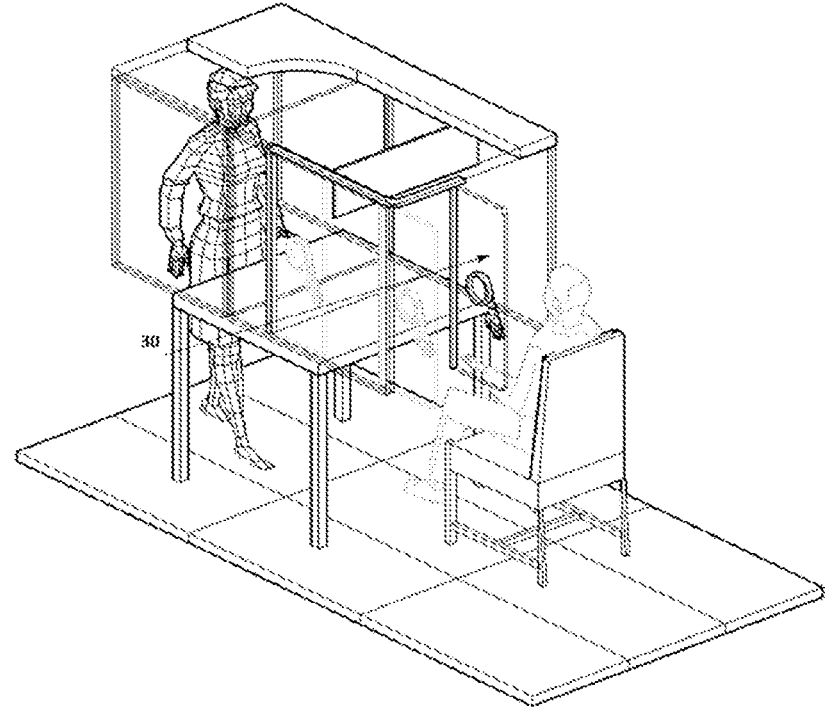

FIG. 8 illustrates a possible form of implementation of the system proposed for close interpersonal interaction in the isolation chamber (15). The reference numbers represent:

30. Moveable lateral protection, shown in position iii).

Figure 9:
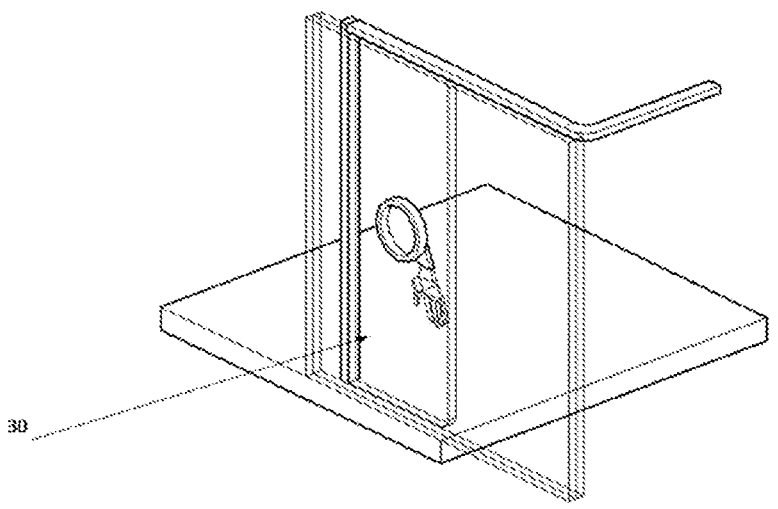

FIG. 9 illustrates a possible form of implementation of the system proposed for close interpersonal interaction in the isolation chamber (15), especially the detailed presentation of the moveable structure (30).

Figure 10:
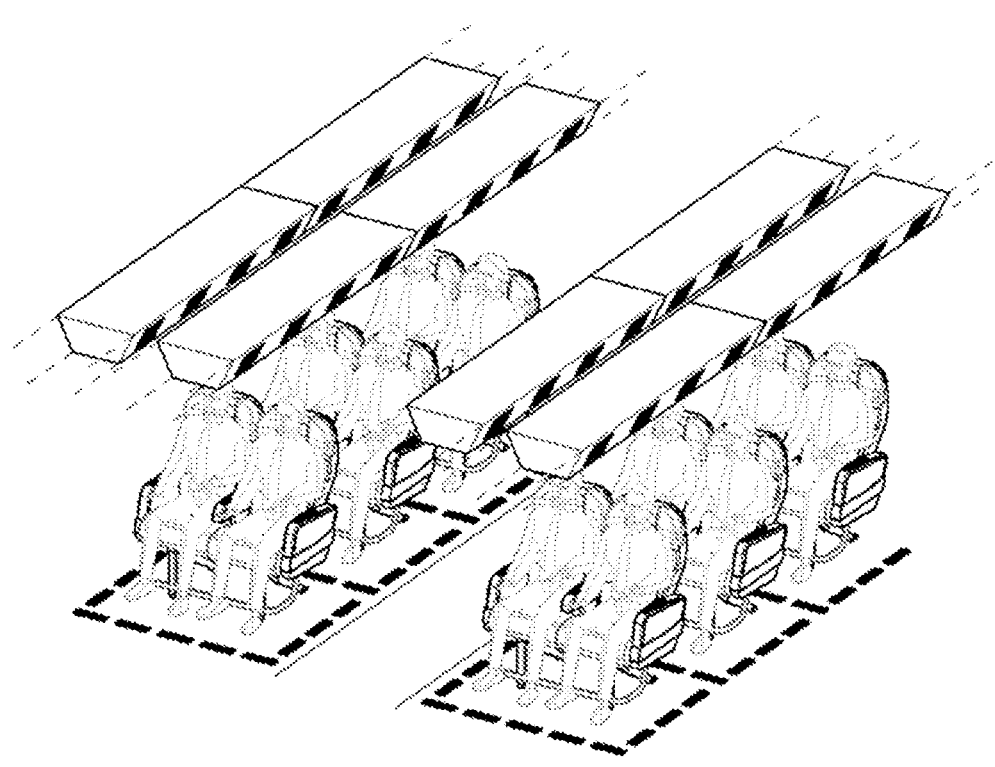

FIG. 10 illustrates a possible form of implementation of the air quality enhancement system applied in transportation systems (road, air or sea), or even in enclosed entertainment venues (cinemas and/or theaters). For this specific case as proposed, the air upflows are placed around the chairs, which are grouped in pairs.

Figure 11:
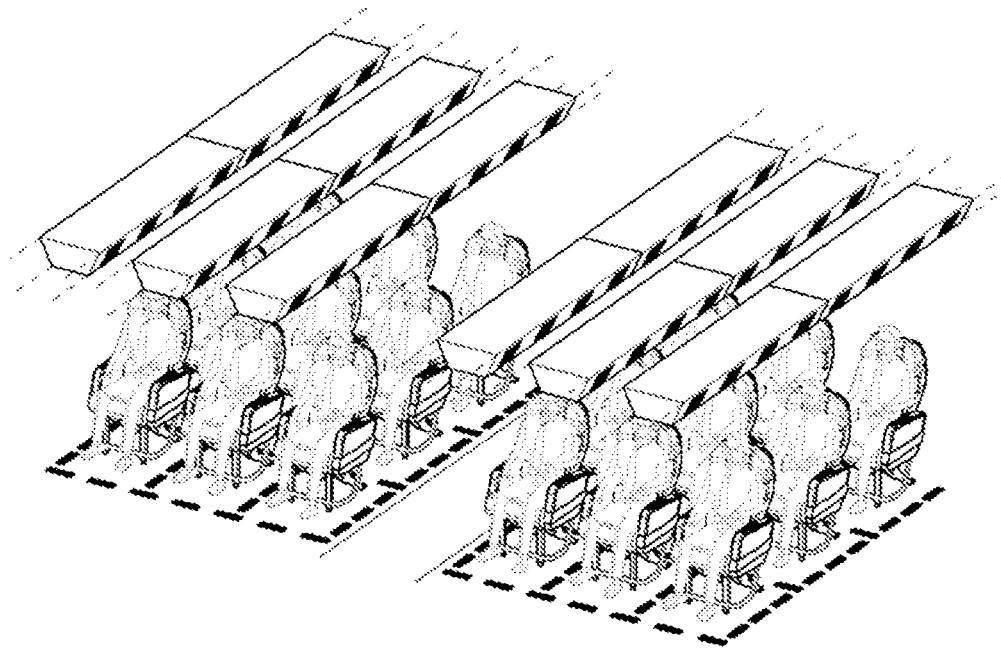

FIG. 11 illustrates another possible form of implementation for the air quality enhancement system applied in transportation systems (road, air or sea), or even in enclosed entertainment venues (cinemas and/or theaters). In contrast to the presentation in FIG. 10, the air upflows are individualized here.

Figure 12:
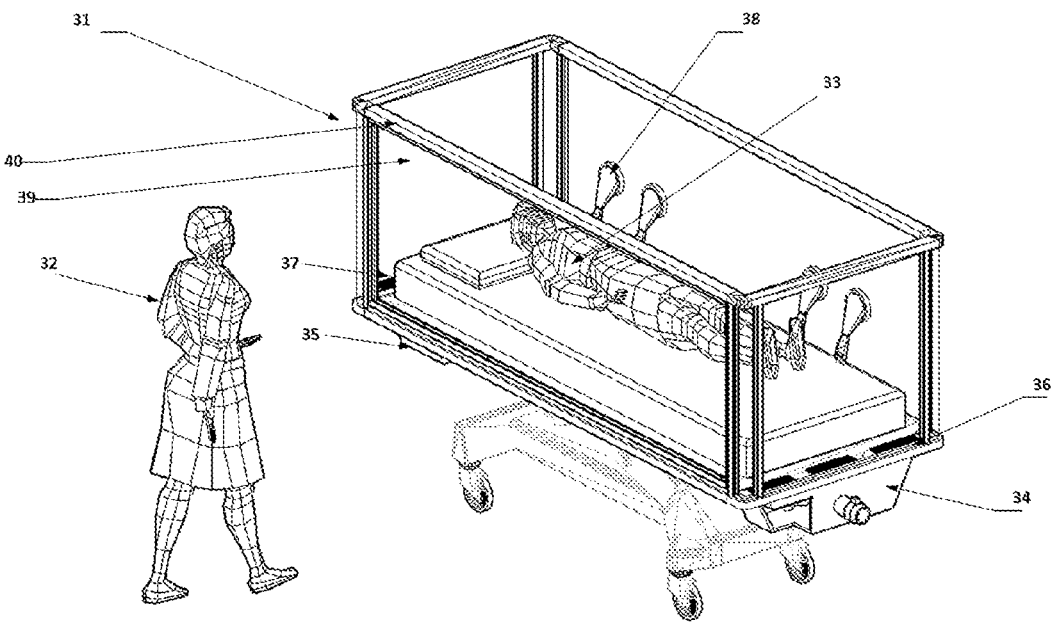

FIG. 12 illustrates another possible form of implementation for the air quality enhancement system applied in isolation chambers, pods, incubators, confined spaces and/or others with a similar purpose, for transporting patients. The reference numbers represent:

31. Isolation chamber and/or pod for transporting people and/or patients;

32. Medical personnel and/or visitors;

33. Patient;

34. Lower injection chamber;

35. Upper extraction chamber;

36. Air and/or gases inflow device;

37. Air and/or gases outflow device;

38. Gloves;

39. Isolating swing flap panel (or access);

40. UV emission system.

Figure 13:
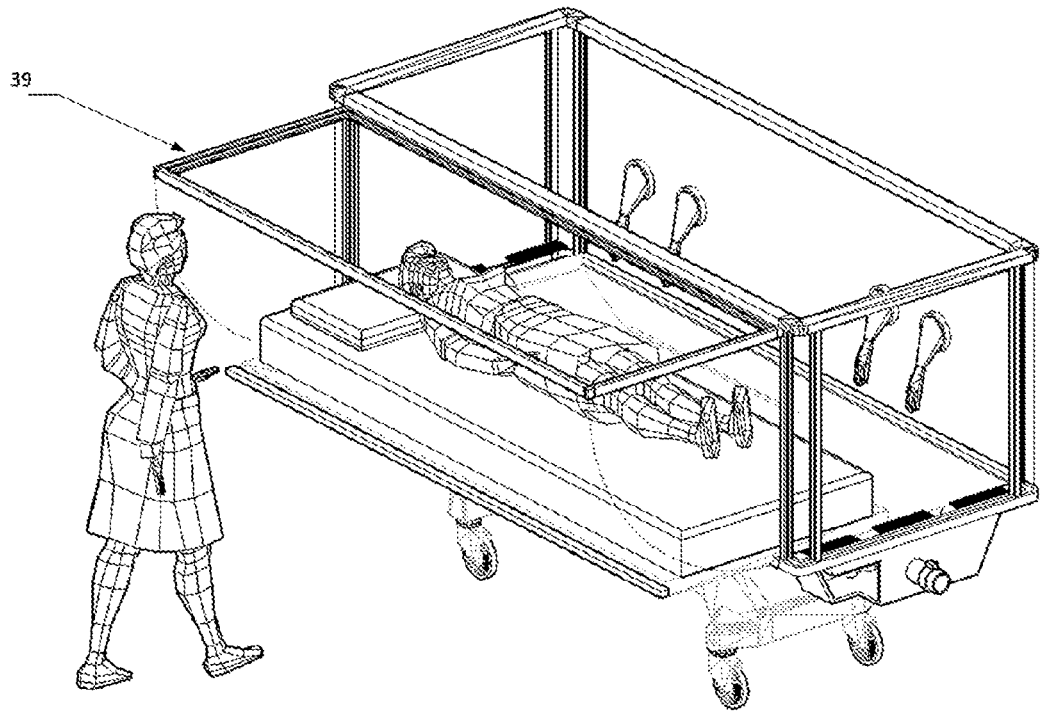

FIG. 13 illustrates another embodiment shown in FIG. 12, which shows the isolating swing flap panel (39) in its open position.

Figure 14:
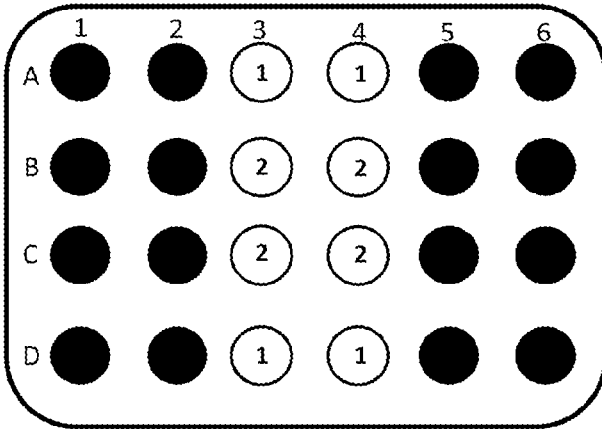

FIG. 14 illustrates the identification scheme for virus samples and the procedure for conducting the experimental test. The filled domes must not be used. The domes marked as 1 correspond to those exposed at an oblique angle (A3+A4+D3+D4). The domes marked as 2 correspond to those exposed at a vertical angle (B3+B4+C3+C4).

Figure 15A:
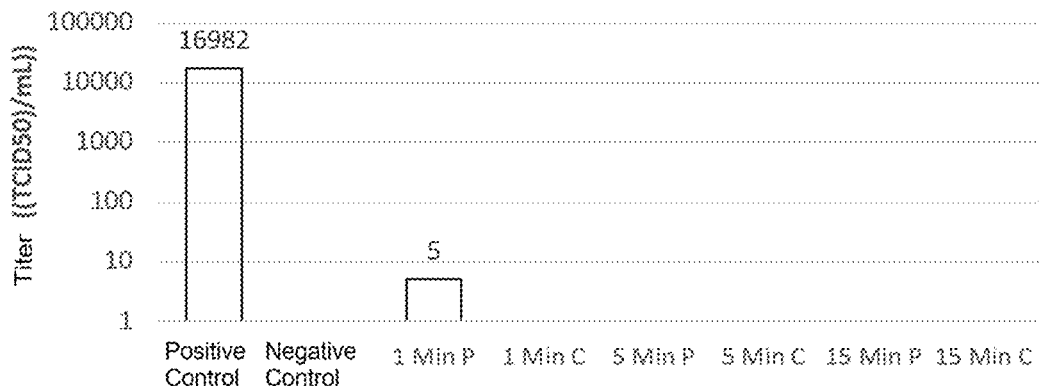
Figure 15B:
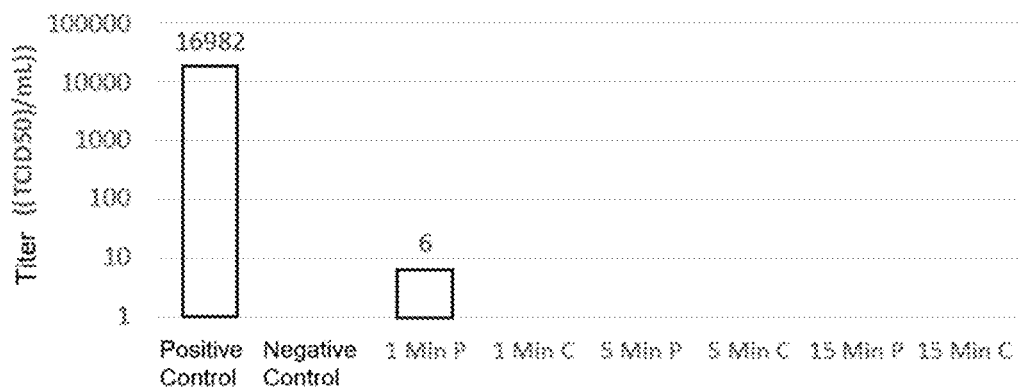
Figure 15C:
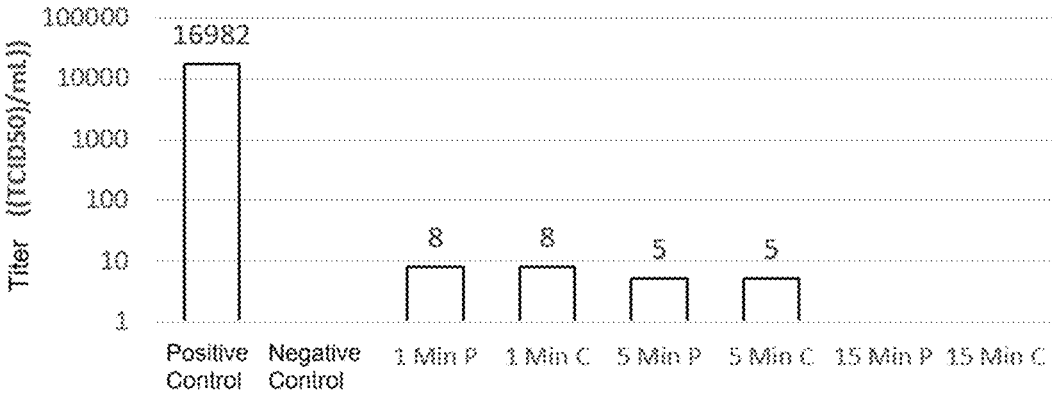

FIGS. 15A, 15B, and 15C illustrates the results obtained at different UV wavelength exposure levels by exposure time, compared to the negative control.

DESCRIPTION OF EMBODIMENTS

Referring to the Figures, some embodiments are now described in greater detail, although they are not intended to limit the scope of this application.

Figure 1:
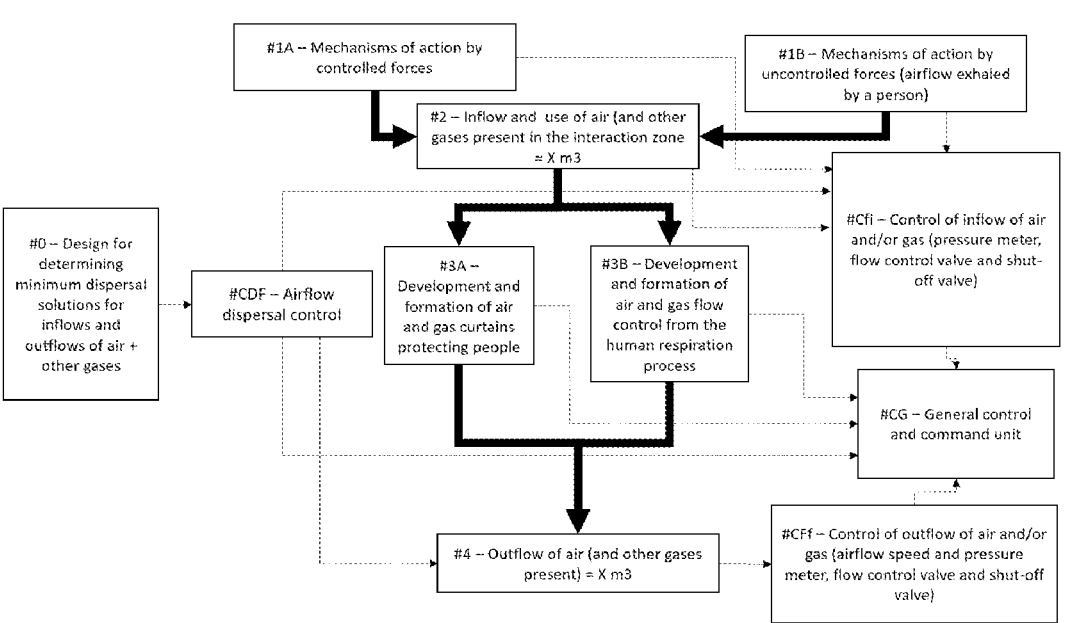
FIG. 1 illustrates the block diagram for the functioning principle of the invention for the interpersonal interaction in confined spaces and indoors scenarios, based on the concept of fluid dynamics integrated with a UV emission system. The Reference numbers represent.

The general concept of the invention is presented in the block diagram shown in FIG. 1, which is underpinned by a novel approach to the protection of people against microorganisms in suspension in the air, such as viruses, bacteria and others, where the flow of air and/or gases is used and controlled to create an air curtain for the protection people, directing this airflow to an inactivation, decontamination and sterilization system, such as controlled and directed UV use, without adversely affecting the health and safety of people.

Initially, and depending on the type of application, interaction and/or space, it is necessary to define the minimum number of inflow and outflow dispersal solutions for and other gases, in order to ensure the formation of air curtains and/or gas flows for the protection of people and also conveying potential virus particles and other microorganisms present in the airborne physical state, into the protection equipment. This is handled through a calculation process in one of the possible forms of embodiment, through the Finite Element Method or Fluid Mechanics models.

The air curtain formation must preferably be arrayed vertically in an upward direction, leaving the microorganism particles in the air for the shortest possible time, where any interpersonal particle projection is minimized, due to the airflow direction. This characteristic is particularly important indoors and in confined spaces, as the natural airflow direction tends to move upwards when there are no forced actions. This is caused by the upflow of heat generated at the lower level, giving rise to these natural flows. However, thanks to current mechanisms in place, the air is once again projected to the lower level, giving rise to turbulent fluid mechanics regimes.

The process of determining the inflow and outflow points for air and/or gases, designated and Referenced in FIG. 1 by (#0) (Design), depends on several factors, which may be part of the geometric and aerodynamic shape of the space, physical obstacles, the minimum and maximum numbers of people (occupancy), size, horizontal floor installation capacity for air and/or gas inflow systems or on the sides of the floor, as well as topside installation for air and/or gas flow intakes, then directing them to the inactivation system, ensuring that the inflow and projection is conducted on the basis of the principle of protection and generation of air curtains. This will create a vertical air upflow that is uniform (or as uniform as possible), rising upwards from the entire lower surface.

Based on the design defining the number of positions, which is calculated minimally from the number of control points based on the equation, there is a control system for the inflows and outflows, whose purpose is to ensure that the inflow is equal to the air and/or gas outflows, as this principle allows the existence of an outflow with the least: possible turbulence that is as laminar as possible.

The inflows and outflows to and from spaces for interaction between people and indoor air in buildings and between people and airborne, overland seaborne transportation systems must tend towards being constant, meaning that Inflow=Outflow. For a personal interaction (person-person) situation with a fluid mechanics control typology consisting of a natural convection system originating in the human respiratory system, due to the volumetric dimension of the chamber presented in the example shown in FIG. 4, its volume must be equal to or greater than the volume of air and/or gases exhaled by the person, which depends on the maximum length of time they will be in contact and interaction with the other person.

For example, the chamber volume will be related to the duration of the consultation between a physician and a user, multiplied by the volumetric quantity of exhaled air and the duration of the inactivation originating from use of the UV emission system. For example, a young adult with an inhaled and exhaled air stream volume of 0.5 liters a minute, meaning that a chamber with a volume of 1000 liters, in other words, one meter long by one meter wide by one meter deep, will have a 2000-minute capacity, meaning 33.33 hours. In addition to its safety in terms of inflow volume, this allows the conceptualization of the chamber to have its upper outlet leading to a microorganism inactivation chamber system that is sized as a function of UV intensity mJ/cm2 (radiometric emissions wavelength metering unit example) that reaches particles in the flow of air and/or gases at the intended level of efficacy, where it is necessary to ensure a contact time between the radiation emission and the particles contact time, in order to reach an efficacy level of 99.97%.

In human presence systems that are complex, due to either their dispersal or density per square meter, a great distribution must be used for lower levels with higher levels, defining the number of air inflow points to indoor areas at a rate of at least $0.15*((A)\hat{}(1/2))$. In this case, A represents the area constituting the application zone of the system that is intended to ensure the correct dispersal of emission points, in order to ensure continuous upward or lower lateral air outflows, in order to ensure protection for users of the above-mentioned space.

Whenever air inactivation is justified by the possible existence of microorganisms at air and/or gas inflow points, this flow shall also run through the same inactivation, disinfection and sterilization chamber that is used for the air and/or gas outflows. Consequently, the above-mentioned chamber may be placed only at the air outflow point of the interaction zone between the person and the building or the person and the transportation systems, such as at the exit and entrance, or only at the entrance.

The (#1A) and (#1B) process shown in FIG. 1 represents the mechanisms of action responsible for the inflow of air and/or gases in the interaction zone between (A) the person and the confined space and/or the inside of the building, through either a controlled forces mechanical system such as a ventilator, or the natural inflow of air and/or gases, using only grids, for example, and (B) interpersonal, which originates in an exhalation from the respiratory system. The (#1A) and (#1B) process is sized through the (#0) process, in accordance with the inflow stream, as a function of the outflow and specifications of the interaction zone in concept (A) and (B), as mentioned above.

The air and/or gases inflow process (#2) shown in FIG. 1 represents the moment after the action of the mechanisms designed to create the flow of air and/or gases, for the purpose of ensuring: the uniform (or as uniform as possible) creation according to the geometry of the space and physical objects formation of rising curtains of air and/or gases for the protection of people, in a manner that prevents horizontal or turbulent projections and flows of air and/or gases, such as spirals for example, and the creation of dead zones that harbor accumulations of microorganisms and increase the potential infection and contamination of people (represents the (#3A) process); and the control of the flow of air and/or gases into the interior of a chamber, ensuring that such flow of air and/or gases does not escape therefrom, but is conveyed upwards to the air and/or gas flow inactivation, disinfection and sterilization zone (represents the (#3B) process).

The function of the (#4) process shown in FIG. 1 is to ensure the outflows of air and/or gases in the same proportion as the inflow volumes, renewing the indoor air in a manner that ensures the greatest possible uniformity. This system is implemented on a forced basis through the action of a controlled force air extraction mechanism, such as a gaseous fluids extraction fan.

The (#4) and (#2) processes shown in FIG. 1 are comprised of a chamber that is part of a UV emission system, with wavelengths between 100 nm and 280 nm, allowing the inactivation of viruses, bacteria and other microorganisms.

In one of the proposed embodiments, UV emission devices may be used with a wavelength of 254 nm, that may vary between 250 nm and 260 nm in accordance with the type of lightbulb, LED or emission and the respective functioning and/or tolerance range. For example, Fair UV wavelengths between 204 nm and 208 nm may be used, with higher intensity and greater inactivation capacity for viruses (as well as bacteria and other microorganisms), over a shorter period of time.

Air inflow (#CFi) and outflow (#CFf) control is handled through a control command that acts on a motor giving rise to the forced air inflow action, and another for the outflow, as well as a flow regulator valve and a cut-off valve, based on an air speed and pressure metering sensor in either the entrance or the exit zone and the air inflow and outflow areas.

The air inflow and outflow controls are initially fitted into the control command system (#CDF) that integrates them, which then interacts with the general control and command unit (#CG).

The (#CG) controls the entire system and information collection from the sensors and actuation systems for all the processes (air flows and speeds, actuation on the flow regulator and cut-off valves and the forced action systems, through controlled mechanical forces that drive and create inflow of air and/or gases and outflows), and also encompasses information collection on:

(i) intensity of the UV light emitted in the entrance or exit zone, or both, depending on the physical configuration of the application of the invention through a radiometric sensor;

(ii) relative humidity in interaction zones between people and the interior of the air and/or gas flow inactivation, disinfection and sterilization chambers;

(iii) an ozone metering sensor, for checking the possible formation of ozone in the UV emission interaction zone in contact with the flow of air and/or gases, compliant with ozone formation standards in terms of air quality, particularly at the air inflow, and in the zone for situations where this means that the air outflow will come into contact with people.

The generation of forced-flow air and/or gas curtains grounded on the use of basic fluid mechanics, through a mechanical system or the creation of temperature or pressure gradients, allows possible contacts with viruses, bacteria or other microorganisms to be directed to inactivation and disinfection zone, through the combined and modular integration of a precise and directed UV radiation emission system, which comprises wavelengths between 200 nm and 280 nm, without adversely affecting public health and the safety of people and users of the space.

In order to ensure the formation of steady outflows of fluids in curtain format, air circulation speeds during the winter may comprise values between 0.02 m/s and 0.18 m/s. In summertime, such speed ranges may comprise values between 0.02 m/s and 0.30 m/s, ensuring compliance with thermal comfort standards.

Generated in a specific part of the chamber, and based on reflective materials, this precise and directed emission also allows increased efficiency with the emission of each wavelength, allowing several reflections within the conduits or chamber zones to reach the viruses again. This enhancement of the efficacy and efficiency of the process is allied to lower electricity consumption, using flat surfaces designed to maximize wavelength reflection.

The size of the conduits needed to allow the air volume to pass through the directed and precise UV emission system is defined by the ratio of the conduit radius (or the main distance from the surface to the center of the conduit, when square and rectangular) with the streams of air (and gases in certain situations) as a function of the outflow speed is defined for the protective curtain. Controlling the airflow speed in this part of the chamber ensures contact and the decay of viruses, bacteria and microorganisms, with at least 99.9% of particle inactivity. This part of the system includes air and/or gas flow speed metering sensors. It may present low inactivity levels, with no guarantee of efficacy for human health safety and protection against airborne infection by viruses, bacteria and other microorganisms. The emission system is installed inside the conduit, and may be placed at any position in the conduit, in parallel and/or between emitting devices, thus ensuring distances between UV emitting devices spaced at least 1 cm to 5 cm, and/or 5 cm to 10 cm, and/or 20 cm to 30 cm, and/or 40 cm to 80 cm apart, placed perpendicular to the conduit and forming perpendicular planes emitting the light, at 1 to n times, compliant with the duration of the passage between the emitting device, the action time/emitting device response, divided by the exposure time. This may consist of values of up to 1 min, or up to 5 min. No significant effect or alteration was noted for longer exposure periods that would justify the extension of this exposure.

For safety reasons, an ozone meter is built into the system, for checking the formation of ozone in the reaction between the air and the UV light. Should a warning be issued for a level higher than permitted, an ozone molecule trap screen is activated.

Still on the issue of safety, in order to increase the flexibility of the system in certain physical configurations, this allows the integration of a heat-emitting conductive action system (air/air and air/thermofluidic heat exchanger type). This allows higher temperatures for air and/or gases in contact with the microorganism particles, at temperature levels above 70° C. and up to 500° C. The higher the applied temperature, the faster and more efficacious is the inactivation, disinfection and sterilization of the flow of air and/or gases. This increase in the efficacy of the system is advantageous for situations with a lack of capacity in terms of physical size and/or volumetric capacity of the air and/or gas flow inactivation, disinfection and sterilization chamber using UV action radiation.

Describing some possible forms of embodiment, FIG. 2 presents the system that has been developed, applied at the interaction between people and confined spaces and/or the interiors of buildings. Reference (1) presents the system as a whole, which is comprised of two chambers (2) and (3), with each of them fitted with: an UV radiation emission source (4) and (5) respectively, air and/or gas inflow conduits (8) into the space (1) (interaction zone between people and the interior of a confined space or interior of a building) and air and/or gas outflows (9) from the space (1). The lower injection chamber (2) may be located below floor level, and is responsible for ensuring the supply of the air and/or gas for the curtain (10) delivered from underneath and released at floor level through its connection with the air and/or gas inflow conduits (8). The upper extraction chamber (3) may be located above the upper surface of the confined space or interior, and is responsible for ensuring that the air curtain intake (10) from the air and/or gas inflow conduits and released at floor level (8) through the air and/or gas outflow conduits (9) installed on the top or the upper side of the space where the system is installed.

The air and/or gases outflow is controlled by a controlled force action system (7), for example a ventilator, and the air and/or gas flow intake is controlled by another controlled force action system (6), that result in air and/or gas upflows forming an air and/or gas curtain (10) for the protection of people during interaction with the above-mentioned space (1). This air curtain (10) ensures that the protection of microorganism particles deriving from the respiratory system through people exhaling is conveyed to the air and/or gas outflows system (9) for inactivation, disinfection and sterilization, as well as removing them from the indoor surroundings of people, being conveyed upwards and avoiding horizontal flows of air and/or gases, the formation of turbulent regimes, and the creation of dead zones in the form of spirals and rotating flows of fluids that lead to a potential increase in the concentration of microorganism particles.

The controlled force action systems (6) and (7) are comprised of an at least one flow regulator valve, cut-off valves, mechanical and/or electrical actuation systems for blowers/fans and/or rotors and/or turbines, allowing the creation of forced air and/or gas flow movements. Systems (6) and (7) may also include a heat source, produced for example through an electrical resistance, for increasing the contact temperature on the air and/or gas inflows and outflows from 70° C. to 500° C., or may also use an air/air transmission heat exchanger. This may serve as either the ancillary actuation system or the supplementary system for situations where a lack of volumetric space is noted in the chambers (2) and (3) as a result of the residence time needed for efficacious inactivation, disinfection and sterilization of the flow of air and/or gases, where the residence times must be shortened as a function of the intended air and/or gases inactivation, disinfection and sterilization percentage. Alternatively, it may comprise a spraying system for antimicrobial chemical compounds, with antiviral, antibacterial and/or antifungal properties, where there is a sprayer line with microspray nozzles and the projection of the chemical agents on to the flow of air and/or gases. Alternatively, it may also be connected to a gamma ray emission system.

References (4) and (5) present the application of the UV radiation emission system, comprised of tubular lightbulb with 360° emission, or through exposure to a chain of UV radiation-emitting LEDs, forming UV beam curtains. The above-mentioned system may also include UV-C radiometric type metering sensors that allow UV radiation emissions to be measured at a distance from where they are installed, in order to gather information. Metering these measurements in mJ/cm2, J/m2 or Ws/cm2 will ensure that the lengths applied inside the chambers have possible values of 254 nm, 255 nm to 280 nm, 260 nm to 270 nm, 200 nm to 225 nm (Far UV). The UV emission source will be sized according to the level of inactivation, disinfection and sterilization to be undertaken, in terms of both the intensity value and its physical size and exposure in the chamber, which may be straight linear horizontal, straight linear vertical, in a spiral, waving, broken, curving, cycloidal, sinuous and mixed.

Chambers (2) and (3) are controlled by an integrated information collection, command, and control system, respectively (11) and (12). This may comprise the use of microprocessors, which receive information from these sensors installed in the system, the controlled force action system (6) and (7), the on and off command of the UV emission system (4) and (5), and the flow regulator and cut-off valves in the system (6), (7), (8) and (9), in order to create an air and/or gas upflow (10), with characteristics that ensure the formation of constant fluid outflows in curtain format, at winter speeds of 0.02 m/s to 0.18 m/s, and at summer speeds of 0.02 m/s to 0.30 m/s, maintaining thermal comfort standards for indoor air quality while at the same time ensuring the time of residence and contact with the flows of air and/or gases at the entrance (8) and exit (9), which have been or are subject to UV radiation exposure at wavelengths of 200 nm to 260 nm, without adversely affecting public health and the safety of people, because they are within an emission zone in a chamber.

The time of residence and contact should be the minimum exposure time for possible particles, as required for efficacious inactivation, disinfection and sterilization of the flows of air and/or gases. For example, at a distance of 10 cm from the center of emissions from the UV light source at between 254 nm to 255 nm, and with a contact time of one minute, the system presents an inactivation rate of over 99%, and may reach values of 99.95% to 99.99%.

The time of residence of the flow of air and/or gases inside the chamber (3) is the result of the ratio of the volumetric size of the chamber (3) with the air and/or gases inflow, with the time of residence resulting from the command given by (11) and (12) controlling the opening and the flow regulator and cut-off valves at (8) and (9) and the percentage inactivation, disinfection and sterilization of the air that is sought.

The integrated control system (11) and (12) is comprised of microprocessors and/or controllers whose purpose is to control all the components comprising the system, assisted by temperature, relative humidity, ozone and CO2 sensors (measuring gas in order to obtain information on indoor air quality, which is used as an indicator for the need to increase the indoor air renewal rate, with the baseline Reference level being 330 ppm to 350 ppm in the atmosphere, and 600 to 800 ppm for indoor spaces), air stream speeds conveyed into the space (1) as well as within the chambers (2) and (3). This also receives information from the UV-C radiometric sensors placed inside chambers (2) and (3), in order to ensure continuous UV radiation emission. Their arrangement and number in the chambers (2) and (3) vary according to the size of the chamber and the flow of air and/or gases streaming through the chamber (2) and (3), with a calculation conducted in a manner that ensures a homogeneous characterization of the emissions and readings of UV radiation in contact with the flow of air and/or gases. These radiometric sensors allow the control and command system to issue warnings (sounds, visuals, lights, messages) should no UV radiation be noted inside the chambers (2) and (3). The microprocessors also receive information on the geometry of the space, the number of users at the site, respiration rate, and mean inhalation and exhalation rate among users of the space. This type of information may be provided through installing additional but not limiting sensor systems. During use and a normal physical pace, the exhalation volume is about 0.5 liters a minute, for respiration rates of 10 to 15 times a minute; however, at gyms and physical training centers, each person may exhale an air volume of 4 to 5 liters a minute.

The types of materials used in the conceptualization of the chambers and their respective interiors ideally have smooth finishes, which maximizes the effective use of the emission reflections inside them, maximizing energy efficiency and the use of UV radiation emissions for actuation on the flow of air and/or gases.

The sizing of the device, the number of inputs and outlets, and the geometrical shape of the conduit grid (8) and (9) are handled through a finite elements numerical model, in order to define the minimum number of points based on needs, which must consider the speeds in order to ensure the formation of the curtain of air and the respective gases for the protection of people, for the above-mentioned values. In addition to the finite elements method based on the above-mentioned decision variables, in systems where the presence of people is complex, due either to their dispersal or their density in square meters, for the air renewal flows streaming into the space (1) a grid distribution may be used with lower planes and upper planes, at a minimum ratio of 0.15*((A)^ (1/2)), where A is the system application zone area, ensuring the correct arrangement of the air upflow or lower side outlet points in order to create air flows providing protection for people in contact with the air (and sometimes the presence of gases in the atmosphere as well).

In FIG. 3, the concept of forming columns through flows of air and/or gases that provide protection for people during interaction with indoor spaces is shown for the situation with a lower side inlet (13.1), or an upper outlet for flows of air and/or gases (13), for situations where it is not possible to locate the inlet on the lower surface and the upper surface in order to create upflows (14) in the space, due to the local physical implementation conditions of the space (1).

FIG. 4 presents a possible form of implementation of the system (1) proposed for close interpersonal interaction. The application concept is the same, with its differential factor consisting only of its application in terms of geometry and functionality. The geometry presented in FIG. 4 is designed for situations of use in an interpersonal interaction system (close person/person contact) for situations where the use of controlled forces is needed to ensure that liquid and gaseous projections from the respiratory systems of users is assured, with extraction through the upper surface (23). In FIG. 5, the surface (23) is completely airtight and with no upper outlet in the zone (26) of the chamber.

The conceptualization, sizing principle, concept and functioning of the chamber (18) is equivalent to references (2) and (3), with as references (19) and (20) are equivalent to reference (9), reference (22) to reference (12), and reference (21) to reference (5).

References (16) and (17) show two people in face-to-face interaction, as might occur for example when a healthcare practitioner is seeing a user, or between an airport control worker with a user of the space, or even interaction between two people in a home. The solution could be applied in many other interaction situations between a worker dealing with the public and a user, such as civil service departments, supermarkets and commercial stores, for example.

Reference (24) identifies an ancillary UV emission system for inactivating viruses and other microorganisms on the lower surface of the interior of the chamber that might present the presence of microorganisms in a liquid state. Reference (25) illustrates a flap for ensuring control of the zone through UV radiation emissions, particularly when the component (24) is composed of a tubular lightbulb with 360° emissions, for example, ensuring that the exposure is not projected to a zone outside the chamber.

Item (26) presents the assembly of materials ensuring the transparent physical implementation of the isolation chamber (15). Nevertheless, and in a non-limiting manner, it may be implemented in another material (metal or not) such as stainless steel, for example, for the purpose of establishing the demonstrated zone shown in FIG. 5 in a tunnel format, which may be formed and composed of a layer of glass and another transparent material such as plastic, composite, biocomposite, transparent bacterial cellulose-based film or another type of transparent material that allows visual interaction between two people.

Consideration must be given to the fact that the material used ensures isolation for more than 98% of UV emission radiation, not passing through the material used and thus reducing exposure thereto to the interior of the isolation chamber (15). Consideration may be given to applying an inner layer and/or film in transparent material such as plastic, composite, biocomposite, transparent bacterial cellulose-based film or another type of transparent material that allows visual interaction between two people or, when external visualization and interaction is not necessary, by material based on stainless steel, aluminum, stainless steel alloys, aluminum alloys, zinc, zinc alloys, iron, iron alloys, wood, wood derivatives, metal and non-metal alloys, mixed metal and non-metal alloys, and others.

Item (27) identifies a physical separator made from transparent material such as glass, plastic, composite, biocomposite, transparent bacterial cellulose-based film or another type of transparent material that allows visual interaction between two people. Its application to the isolation chambers (15) is not imperative, and may be removed, with the chamber operating in the format of a constantly open tunnel, ensuring its functionality through the upper extraction chamber (18).

The isolation chamber (15) is also designed to include a moveable lateral protection structure (30) that allows closer contact for one of the people, being able to touch or conduct close-up operations, such as when a physician wishes to observe a user more closely (FIG. 6).

This allows movement from position i), illustrated in FIG. 6, inner zone and with exposure to UV radiation for inactivation, disinfection and sterilization.

Position ii), illustrated in FIG. 7, allows lateral visual approximation.

Position iii), illustrated in FIG. 8, allows safe contact between a person with another person, using a block made from flexible material.

This always allows the mobile structure to move at any height among the three positions i), ii) and iii).

FIG. 9 shows the mobile structure (30) in greater detail, which may be added to the invention for interaction between people with people.

The size of the interior of the chamber is defined as a function of the implementation zones, the duration of the contact time and/or exposure between the users of these isolation chambers, the period of time between users, and the incorporation or not of an extraction chamber (18) (which reduces volumetric needs), as well as issues related to ergonomics and visual interaction and space needs, in order to avoid phenomena related to claustrophobia.

The part of the assembly of all the components may be undertaken at the implementation site or in the production area, due to the geometry and conceptualization, with local assembly by components allowed.

The chamber (31) presented in FIG. 12 is functionally very similar concept to that shown in FIG. 2, with the difference that there is no movement zone for people. Here, it is necessary to ensure that a safety zone is created within the pod or incubator (31), where the interaction of the person/user to be transported will not give rise to the emission and release of suspended particles through breathing, or generate flows of air and/or gases towards the outside; furthermore, as a very important aspect after the transportation phase, ensuring that the patient will not leave the chamber with flows of air and/or gases with high particle concentrations. Consequently, the public health risk of infection through transmission may be reduced by improving the interior air quality deriving from the temporary context of patients between spaces, and the integration deriving from the moment of opening the part required by this type of operation. Should the chamber not include an inactivation, disinfection and sterilization system for its own interior air, possible infections may occur through the eyes, or even higher concentration levels of viruses and other microorganisms in the intake areas for these patients, even in situations where masks are worn by the people who will handle the transportation and removal of the person/user. This downgrading of indoor air quality increases the probability that the users of these spaces will contract infections caused by microorganisms, normally associated with spending long periods in hospitals. On the other hand, the absence of this type of equipment and its respective use in closed spaces means that people and/or users waiting to be seen might inadvertently inhale other virus particles and other microorganisms, which might potentially worsen their clinical status, or that of other people in the interaction and waiting zone.

The chamber (31) presented in FIG. 12 presents another possible application of the invention from among the countless possible adaptations, for the situation of special transportation by medical personnel (32) (for example) and a person/user (33) in a situation of possible contamination or infection by microorganisms. The conceptual functioning of the system is similar to that shown in FIG. 2, as well as inflow of air and/or gases (36) through the lower injection chamber (34), allowing the creation of an airtight zone in the isolation chamber (31), and the patient (33) can breathe, creating an air and/or gas flow with an outflow in upper extraction chamber (35) assured by the air and/or gas outflow grids (37). In terms of their structure and functioning, chambers (34) and (35) are equivalent and similar to references (2) and (3) respectively. The gloves (38) allow safe interaction between medical personnel (32) and the person/user (33), whereby some physical interaction may take place, if needed. The swing flap panel (39) allows the opening of the pod or incubator or confined system used for the transportation of people, as shown in FIG. 13, for the entry and exit of the person/user. Reference (40) presents the UV emission system, which is identical to the system proposed in reference (24) that may be activated through a conventional energy source (for example, an electrical outlet or battery) in order to disinfect the interior space after removal of the patient.

The isolation chamber (31) may also be used in transporting people in a radioactive contamination situation, with the installation of a gamma ray wave release system in the chambers (34) and (35), which may be adapted and used in one of the proposed forms of embodiment.

In terms of the experimental results obtained, the UV antiviral activity was assessed for SARS-COV-2 (Severe Acute Respiratory Syndrome caused by Coronavirus 2) with Isolate USA-WA1/2020, previously expanded and tittered in VERO C1008 cells. A fixed quantity of virus (104 TCID50/mL) was used, with different UV-C exposure conditions. An infection control was used with no UV exposure.

Using the 256 nm wavelength in a chamber format similar to a conduit or person-to-person interaction box zone, as shown in the drawings presented in FIGS. 4 and 5, antiviral activity resulting from the application of UV emission was assessed using SARS-COV-2, with Isolate USA-WA1/2020 previously expanded and tittered in VERO C1008 cells. A fixed quantity of virus (104 TCID50/mL) was used, with different UV exposure conditions, with a range of times and intensities. An infection control was used with no UV exposure.

Cell line used: VERO E6 (VERO C1008), obtained from ATCC (ATCC® CRL 1586TM). Growth medium: The basic medium for this cell lineage was Minimum Eagle's Essential Medium, containing Earle's Balanced Salt Solution, non-essential amino acids (AA) at 2 mM L-glutamine (SIGMA; M0325; Batch RNBJ2226), sodium pyruvate 1 mM (Cytiva, HyClone SH40003.01) and 1500 mg/L sodium bicarbonate. In order to prepare the complete growth medium, fetal bovine serum (Cytiva HyClone SV30160.03; Batch No RE00000004) was added to a final concentration of 10% (v/v). Conditions: The cells were cultivated in a complete growth medium at 37° C. and 5% of $CO^2$. The medium was replaced two to three times a week. Subcultures (1:4) were taken when the cell density was 90% to 100%. Passaging: The cells used in the tests were derived from the fourth passaging.

Obtained from American Type Culture Collection ATCC (item NR-52281; Batch N° 70034262) in May 2020. Shipped in dry ice. The infectious virus titer was calculated through final point dilution, using the Reed-Muench method on the same cells as used in the test and expressed as TCID50/mL (infectious dose of the tissue culture 50%/milliliter)

Test protocol details: the inhibition test was conducted on dishes with 24 points on a dish (Nunclon Delta Surface; Thermo Fisher Scientific, 142475; Batch N° 155516) at a final volume of 100 µL at each point. As shown in FIG. 8, SARS-CoV-2, was added to a concentration of 104 TCID50/mL per point, at points A3, B3, A4, B4, C3, C4, D3 and D4, as shown in FIG. 14.

As shown in FIG. 14, four points were used in each test, with a SARs-COV-2 viral load and a mean of 16892 virus particles, for triple testing. In other words, three boxes identical to those shown in FIG. 14 were placed alongside each other, with 24 measuring points used for each test. Each test was replicated three times, with variations in exposure time, intensity and incidence angle, meaning that eight points were used three times, giving 24 points. As shown in FIG. 14, four points were used in each test, with a SARs-COV-2 viral load with a mean of 16892 virus particles, for triple testing. In other words, three boxes identical to those shown in FIG. 14 were placed alongside each other, with 24 measuring points used for each test. Each test was replicated three times, with variations in exposure time, intensity and incidence angle, meaning that eight points were used three times, giving 24 points. At each 24 points, an exposure of SARS-COV-2 to UV wavelengths was used (applicable at 204 nm to 260 nm, with a peak wavelength of 254 nm). The dishes were then exposed to UV wavelengths at 254 nm for different lengths of time: 1, 5 and 15 minutes; and at different distances: 10, 20 and 30 cm. After exposure to the wavelengths, the contents of the most outlying points (A3, A4, D3 and D4; referred to as "1") were collected as an individual sample, as well as those taken from the most central points (B3, B4, C3 and C4; referred to as "2").

Each experiment was repeated in triplicate. After each test, Samples 1 and 2 for each time/distance were diluted in series in the growth medium, in order to obtain the following dilutions: 100 10-1, 10-2 and 10-3. Each dilution was inoculated into VERO cells that were shown the previous day at 1×104 cells/point in 100 µL of growth medium and incubated at 37° C. in a humidified CO2 atmosphere at 5%. After three days of incubation, the TCID50/mL was calculated through end-point dilution (Reed & Muench method).

The controls included: 1-A "positive" control with no virus exposed to the wavelengths, in order to allow viral replication with no prior inactivation, and 2-A "negative" control with no virus added, in order to check the background.

The results are presented in Table 1 and FIGS. 15A-C, with the geometry of the chamber used in the test being the same type of person/person interaction chamber, which may also be used as a larger scale or with fluid outflow definition during interaction between a person and a building or airborne, overland and waterborne passenger transportation systems.

TABLE 1

Results of SARS-CoV-2 exposure to UV radiation at wavelengths of 256 nm, for example, within a possible interval of 207 nm to 260 nm.

| | | Conditions | Mean | Titer ((TCID50)/mL) | | | Original inoculum |
|---|---|---|---|---|---|---|---|
| | | | | Replica 1 | Replica 2 | Replica 3 | |
| | | Positive control | 16982 | 19891 | 14972 | 16082 | 19952 |
| | | Negative control | 0 | 0 | 0 | 0 | |
| 10 cm | 1 m | 1 Min P | 5 | 4 | 7 | 3 | |
| | | 1 Min C | 0 | 0 | 0 | 0 | |
| | 5 m | 5 Min P | 0 | 0 | 0 | 0 | |
| | | 5 Min C | 0 | 0 | 0 | 0 | |
| | 15 m | 15 Min P | 0 | 0 | 0 | 0 | |
| | | 15 Min C | 0 | 0 | 0 | 0 | |
| | | Positive control | 16982 | 19891 | 14972 | 16082 | |
| | | Negative control | 0 | 0 | 0 | 0 | |
| 20 cm | 1 m | 1 Min P | 6 | 8 | 5 | 6 | |
| | | 1 Min C | 0 | 0 | 0 | 0 | |
| | 5 m | 5 Min P | 0 | 0 | 0 | 0 | |
| | | 5 Min C | 0 | 0 | 0 | 0 | |
| | 15 m | 15 Min P | 0 | 0 | 0 | 0 | |
| | | 15 Min C | 0 | 0 | 0 | 0 | |
| | | Positive control | 16982 | 19891 | 14972 | 16082 | |
| | | Negative control | 0 | 0 | 0 | 0 | |
| 30 cm | 1 m | 1 Min P | 8 | 9 | 9 | 7 | |
| | | 1 Min C | 8 | 8 | 8 | 9 | |
| | 5 m | 5 Min P | 5 | 3 | 7 | 6 | |
| | | 5 Min C | 5 | 6 | 6 | 4 | |
| | 15 m | 15 Min P | 0 | 0 | 0 | 0 | |
| | | 15 Min C | 0 | 0 | 0 | 0 | |

Tests were also conducted with the same fluid mechanics typology and integration of a UV emission system with wavelengths of 256 nm for target bacteria of interest causing infection problems in healthcare facilities, such as hospitals, for example. This is also under development for the context of other viruses and bacteria of interest, such as Tuberculosis, SARs-COV-1, Avian Influenza (H5N1), H1N1 (2009, Influenza virus).

In a non-limiting manner, the proposed air quality enhancement system may be considered for stand-alone application, or for joint application, integrated into existing ventilation systems, forced air conduits, refrigeration systems or even air-conditioning systems. Its modularity and applicability make the system that has been developed adaptable to current devices, allowing its rapid expansion on the market for this type of equipment, making them safer and also endowing them with additional purification capacity for recirculated air.

This description is naturally not limited in any manner whatsoever to the embodiments presented in this document, and a person with average knowledge of this field could foresee many possibilities for the modification thereof, without moving away from the general idea as defined in the claims. The embodiments described above can obviously be combined among themselves. The following claims additionally define preferred embodiments.

The invention claimed is:

1. Air quality enhancement system, for deployment at a close interpersonal interaction point, comprising
at least one isolation chamber; and
at least one extraction chamber;
wherein
the at least one extraction chamber comprises
at least one conduit for intake of individualized airflow, installed on an upper surface of the at least one isolation chamber, and
at least one UV rays emission source,
wherein the isolation chamber comprises a physical structure comprised of a transparent separator and a protective divider.

2. The system according to claim 1, comprising a moveable lateral protection.

3. The system according to claim 1, wherein the at least one extraction chamber comprises at least one integrated information collection, command, and control system.

4. The system according to claim 1, wherein the at least one conduit for the intake of the individualized airflow comprises
at least one controlled force action system for the intake of the flow of air and/or gases, comprising
at least one flow regulator valve, cut-off valves, mechanical and electrical actuation systems for blowers/fans and/or rotors and/or turbines,
a heat source for increasing the contact temperature of the air and/or gas inflows and outflows from 70° C. to 500° C.; and
a system for spraying antimicrobial chemical compounds with antiviral and/or antibacterial and/or antifungal properties, comprised of a line of sprayers with microspray nozzles projecting over the flow of air and/or gases.

5. A method of functioning for the air quality enhancement system according to claim 1, comprising:

i. placing a person/User A and a person/User B at the chamber entrance positions, which allows audiovisual interaction;

ii. allowing for a physical barrier in the chamber and a method for controlling contact between people/users;

iii. conveying the air exhaled by people/users into the inside of the chamber, within the context of the specific placement of people/users, the geometry of the chamber and the direction and flow of air and/or gases generated by the respiratory system, as well as projections of droplets generated by people;

iv. allowing droplet projections and the flow of air and/or gases generated during respiration to be trapped in the chamber, whose geometry may vary, in order to have the correct volume;

v. providing lateral protection of the chamber in the form of "flaps" that prevent the generation of lateral cross-flows or turbulent flows that give rise to early air and/or gas outflows, without first being inactivated;

vi. extracting the air that is in the chamber by a controlled force system that conveys it and ensures there are no air and/or gas outflows towards people, but rather through the upper outlet where it is thus inactivated;

vii. depending on the frequency of the interaction and duration of the interaction between people/users, the chamber functions without the first extraction system, through the system that already has interior UV emission integrated therewith, with protection through materials and geometry that ensure the UV rays are not projected outside the chamber, in order to protect the safety and health of people/users;

viii. optionally removing the central barrier separating the two interaction zones in order to allow direct interaction through a visual interior tunnel format;

ix. allowing close physical contact between a person and person/user, through an internal moveable lateral system that allows physical protection to be moved through a chute to the area alongside the person, who can then engage in contact actions with protection, through using a fixed glove that serves as a physical barrier, and restoring the capacity of the chamber by returning the glove to the inside of the chamber so that it can be disinfected, inactivating possible virus particles and other microorganisms.

\* \* \* \* \*